US008880568B2

(12) United States Patent
Perczynski et al.

(10) Patent No.: US 8,880,568 B2
(45) Date of Patent: Nov. 4, 2014

(54) REPORT GENERATION FOR A NAVIGATION-RELATED DATABASE

(75) Inventors: David Perczynski, Lemont, IL (US); Oliver Fink, Moerfelden-Walldorf (DE)

(73) Assignee: HERE Global B.V., Veldhoven (NL)

( * ) Notice: Subject to any disclaimer, the term of this patent is extended or adjusted under 35 U.S.C. 154(b) by 894 days.

(21) Appl. No.: 12/335,687

(22) Filed: Dec. 16, 2008

(65) Prior Publication Data

US 2010/0153348 A1 Jun. 17, 2010

(51) Int. Cl.
*G06F 17/30* (2006.01)
*G01C 21/32* (2006.01)

(52) U.S. Cl.
CPC .......... *G06F 17/30241* (2013.01); *G01C 21/32* (2013.01)
USPC ........... 707/804; 707/806; 707/756; 707/722; 707/725; 715/850; 715/712

(58) Field of Classification Search
CPC ................................. G06F 17/30; G06F 17/00
See application file for complete search history.

(56) References Cited

U.S. PATENT DOCUMENTS

| | | | | |
|---|---|---|---|---|
| 4,920,488 | A * | 4/1990 | Filley | 705/28 |
| 5,414,462 | A * | 5/1995 | Veatch | 348/135 |
| 6,253,151 | B1 * | 6/2001 | Ohler et al. | 701/409 |
| 6,538,674 | B1 * | 3/2003 | Shibata et al. | 715/855 |
| 6,718,258 | B1 * | 4/2004 | Barton | 701/200 |
| 6,766,041 | B2 * | 7/2004 | Golden et al. | 382/117 |
| 7,146,188 | B2 * | 12/2006 | Deeds | 455/556.1 |
| 7,327,998 | B2 * | 2/2008 | Kumar et al. | 455/405 |
| 7,406,482 | B2 * | 7/2008 | Dorum et al. | 1/1 |
| 2002/0059246 | A1 * | 5/2002 | Rowe | 707/10 |
| 2004/0145602 | A1 * | 7/2004 | Sun et al. | 345/720 |
| 2004/0152485 | A1 * | 8/2004 | Deeds | 455/556.1 |
| 2004/0186661 | A1 * | 9/2004 | Barton | 701/200 |
| 2004/0220922 | A1 * | 11/2004 | Lovison et al. | 707/3 |
| 2005/0060299 | A1 * | 3/2005 | Filley et al. | 707/3 |
| 2005/0283699 | A1 * | 12/2005 | Nomura et al. | 714/746 |
| 2006/0026084 | A1 * | 2/2006 | Bonham et al. | 705/35 |
| 2006/0089793 | A1 * | 4/2006 | Rudow et al. | 701/208 |
| 2006/0135119 | A1 * | 6/2006 | Kumar et al. | 455/405 |
| 2006/0142943 | A1 * | 6/2006 | Park | 701/213 |
| 2006/0204098 | A1 * | 9/2006 | Gaast | 382/182 |

(Continued)

FOREIGN PATENT DOCUMENTS

GB 2425858 A 8/2006
JP H10-174148 6/1998

OTHER PUBLICATIONS

Kennedy, et al., "How Flickr Helps Us Make Sense of the World: Context and Content in Community-Contributed Media Collections," ACM, Conference on Multimedia, Sep. 23, 2007, pp. 631-940.*

(Continued)

*Primary Examiner* — Farhan Syed
(74) *Attorney, Agent, or Firm* — Lempia Summerfield Katz LLC

(57) ABSTRACT

Systems, devices, features, and methods for updating a geographic database, such as a navigation-related database, and/or reporting discrepancies associated with geographic data of the geographic database are disclosed. For example, one method comprises capturing a photograph of an observed geographic feature in a geographic region. Comment information corresponding to the observed geographic feature may be stored. The comment information is indicative of a discrepancy between the observed geographic feature and the geographic data corresponding to the geographic region. The comment information may be associated with the photograph to generate a report, and the report is transmitted.

19 Claims, 8 Drawing Sheets

(56) References Cited

U.S. PATENT DOCUMENTS

| | | | | |
|---|---|---|---|---|
| 2006/0282467 | A1* | 12/2006 | Peterson et al. | 707/104.1 |
| 2006/0287872 | A1* | 12/2006 | Simrell | 705/1 |
| 2006/0288014 | A1* | 12/2006 | Edwards et al. | 707/100 |
| 2008/0082225 | A1 | 4/2008 | Barrett | |
| 2008/0082264 | A1* | 4/2008 | Hill et al. | 701/213 |
| 2008/0084332 | A1* | 4/2008 | Ritter et al. | 340/989 |
| 2008/0084333 | A1* | 4/2008 | Forrest et al. | 340/989 |
| 2008/0086685 | A1* | 4/2008 | Janky et al. | 715/700 |
| 2008/0120129 | A1* | 5/2008 | Seubert et al. | 705/1 |
| 2008/0195638 | A1* | 8/2008 | Winberry et al. | 707/100 |
| 2009/0006185 | A1* | 1/2009 | Stinson | 705/10 |
| 2010/0128935 | A1* | 5/2010 | Filley et al. | 382/113 |
| 2010/0153348 | A1* | 6/2010 | Perczynski et al. | 707/692 |

OTHER PUBLICATIONS

Bresse, M., et al., "Travel Blog Assistant System (TBAS) an example scenario of how to enrich text with images with text using online multimedia repositories," Metadata Mining for Image Understanding Workshop, 2008, pp. 90-104.*

Printed Demo for Map Insight. Tele Atlas, pp. 1-8. Demo for Tele Atlas Map Insight at http://mapinsight.teleatlas.com/mapfeedback/help/demoEN.html. Visited on Dec. 3, 2008.

Extended European Search Report, Dec. 1, 2011, pp. 1-12.

Australian Examination Report in AU 2009233628, mailed Aug. 19, 2014.

* cited by examiner

REPORT GENERATION FOR A NAVIGATION-RELATED DATABASE

BACKGROUND OF THE INVENTION

The present invention relates to geographic data and navigation and, more particularly, to updating a navigation-related database and/or reporting discrepancies regarding geographic data.

Navigation systems or devices provide useful features, such as calculating routes to desired destinations and providing guidance for following the routes. In order to provide these features, navigation systems use geographic data that include information about the locations of roads and intersections, estimated travel times along road segments, the speed limits along roads, etc.

The collection of geographic data for use in navigation systems may be a significant undertaking. For example, the initial collection of data about the roads in a geographic area may be time consuming. Also, geographic data used in navigation systems become out-of-date. For example, new roads are built, businesses change locations, road construction closes roads, detours are established, museum and restaurant hours change, etc. There also may be errors in collected geographic data. Accordingly, end users who have navigation systems may discover that certain geographic data used in their navigation systems are not up-to-date, not correct, or not accurate.

Updating and checking the geographic data may involve significant efforts. Therefore, providing up-to-date and accurate geographic data, such as for use in navigation systems, is a continuing effort.

SUMMARY OF THE INVENTION

According to one aspect, a method for updating a geographic database that includes geographic data for navigation-related services is provided. For example, a photograph of an observed geographic feature in a geographic region is captured. Comment information corresponding to the observed geographic feature may be stored. The comment information is indicative of a discrepancy between the observed geographic feature and the geographic data corresponding to the geographic region. The comment information may be associated with the photograph to generate a report, and the report is transmitted.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
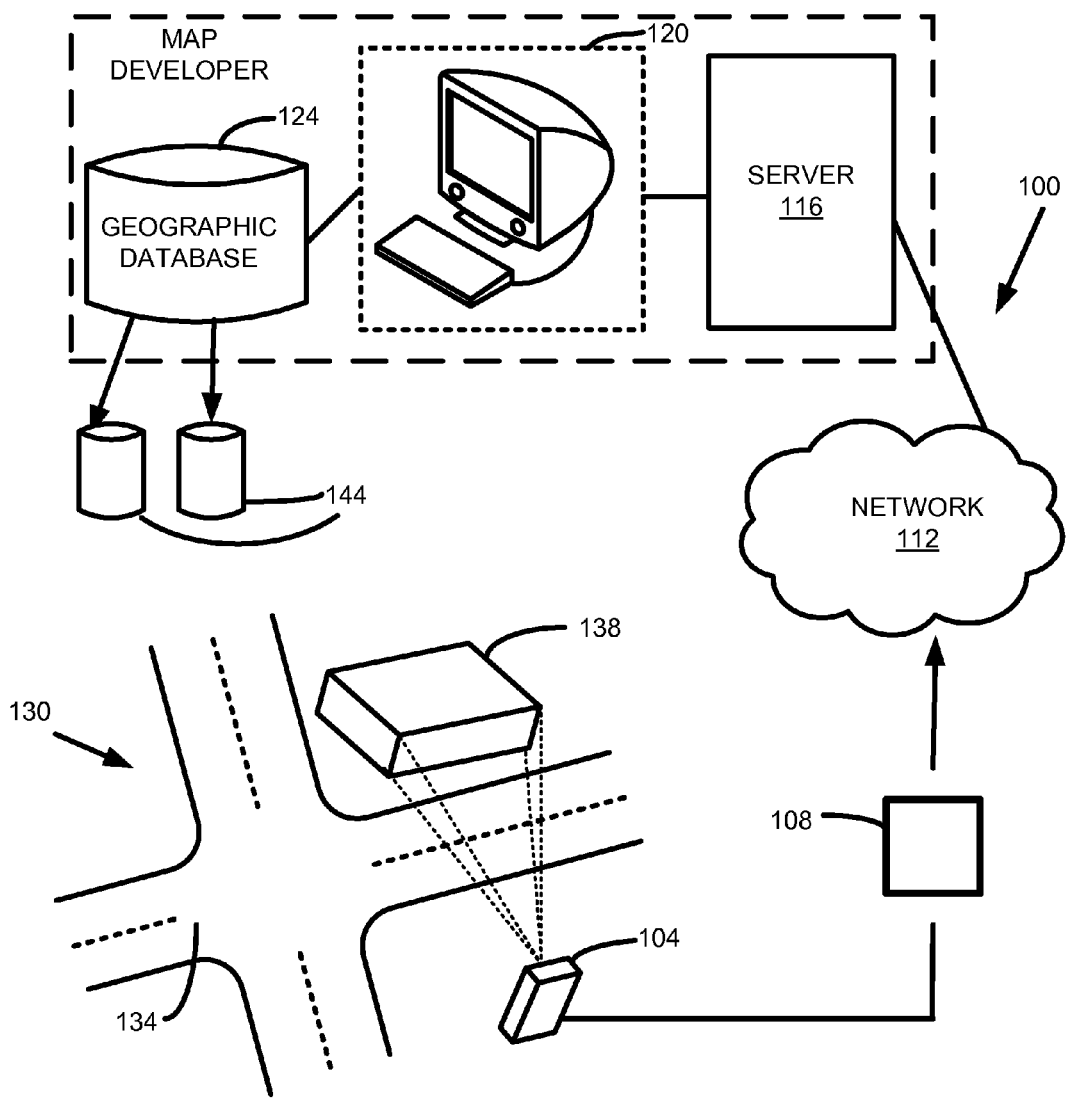
FIG. 1 is a diagram of a system for updating a geographic database and/or reporting discrepancies regarding geographic data of the geographic database.

FIG. 1 shows one embodiment of a system 100 for updating a geographic database and/or reporting discrepancies regarding geographic data. The system 100 includes, but is not limited to, a user device 104, a network 112, a server 116, one or more workstations 120, and a geographic or navigation-related database 124. Additional, fewer, or different components may be provided. For example, a proxy server, a cache server or cache network, a base station, transceiver and/or broadcasting components, a router, a switch or intelligent switch, additional computers or workstations, administrative components, a gateway device, a backbone, ports, network connections, and network interfaces may be provided. While the components in FIG. 1 are shown as separate from one another, one or more of these components may be combined.

The user device is a cellular telephone, a mobile phone, a personal digital assistant ("PDA"), a watch, a camera, a computer, a personal navigation device ("PND"), a portable navigation device, and/or any other electronic device capable of taking a photograph. For example, the user device 104 is a cellular telephone equipped with a camera, such as a cellular telephone provided by Nokia Corporation located in Espoo, Finland.

The user device 104 is used to report discrepancies between observed real-world geographic features and geographic data in which the geographic data may be represented or presented via a system or device, such as a navigation system or device. For example, a geographic region 130 includes, but is not limited to, a road network 134 and a building or point-of-interest ("POI") 138. The geographic database 124 may not include data representing the building 138 or may include erroneous data regarding the building 138. Accordingly, the user device 104 is used to capture a photograph of the building 138, an observed geographic feature. The photograph may be combined or associated with one or more comments or comment input corresponding to a discrepancy between the observed building 138 and geographic data corresponding to the building 138 or the lack thereof. For example, the discrepancy may be a perceived error and/or lack of information in geographic data used to represent the geographic region 130. The photograph may also be associated with position information or data, such as latitude, longitude, altitude, and/or direction information. The photograph along with associated information is formed or generated into one or more reports 108.

The report 108 includes comment information, position data, the photograph or data representing the photograph, and/or other associated data or information (e.g., a descriptive sketch or a time stamp corresponding to a captured photograph). The report 108 may be structured similar to an email. For example, comment information may be configured as text, such as in an XML or HTML format, and the photograph or data thereof may be associated to the text as an attachment. The photograph data may include the position data. Alternatively, the position data is part of the text or may be part or both the text data and the image data of the photograph. The report 108 may be organized or structured in other formats and manners. In an alternate embodiment, the report may be the photograph itself (e.g., a photograph file associated with data, header information, and/or tags used for transferring and/or storing data file(s)), with or without position or comment data. Geographic position information may be deduced from the photograph or comment information.

The report 108 is sent, transmitted, and/or uploaded to a map developer or geographic database developer via the network 112. The network 112 is the Internet, an intranet, a local area network ("LAN"), a wide area network ("WAN"), a virtual private network ("VPN"), a cellular network, a satellite network, a broadcasting network, a wireless or wired connection, and/or any known or future network or connection.

The map developer controls, manages, owns, and/or oversees the server 116, the workstations 120, and the geographic database 124. The report 108 is received and stored in the server 116. The server 116 is a provider server, application server, communications server, email server, database server, proxy server, file server, web server, client server, peer-to-peer server, and/or any known or future server or data collection device. The server 116 is a software and/or hardware implementation. For example, the server 116 is an application program. Alternatively, the server 116 is a server computer or any other hardware that executes and runs server applications.

The server 116 may include a database or memory as well as other components to store, organize, and/or prioritize reports, such as the report 108. The server 116 transmits or sends the report 108 to one or more workstations 120, or the workstation 120 downloads or retrieves the report 108 from the server 116.

The workstation 120 is a computer, console, and/or other electronic device or system used to view geographic data and to change, alter, modify, or update the geographic data. Personnel working at the workstation 120 review the report 108 to decide whether to update, add, modify, and/or correct geographic data based on the photograph, comment information, position data, and/or other report information. If the report 108 shows or presents an actual error or lack of information in the geographic data, the geographic data is corrected or updated by modifying or adding information.

The geographic data is stored in the geographic database 124, and, accordingly, corrections and/or updates to the geographic data results in an updated or corrected geographic database 124. In one embodiment, the geographic database 124 includes data used for navigation-related services. For example, the geographic database 124 contains road segment and node data records that represent a road network, such as the road network 134. A node represents an end point of a road segment. The road segments and nodes may be associated with attributes, such as geographic coordinates, street names, address ranges, turn restrictions at intersections, and other vehicle navigation attributes, as well as POIs, such as gasoline stations, hotels, restaurants, museums, stadiums, offices, automobile dealerships, auto repair shops, buildings, stores, etc.

There are different ways to collect data used for developing the geographic database 124, such as by a map developer or geographic database developer. These ways include obtaining data from other sources, such as municipalities. In addition, the geographic database developer may employ geld personnel to travel by vehicle along roads throughout the geographic region to observe features and record information about them (e.g., using GPS tracking or geo-coding to model road patterns). The data collected by the geographic database developer are stored in a master geographic database, such as the geographic database 124. The master geographic database 124 is stored in a format that facilitates updating, maintenance, and development. For example, the master geographic database 124 or data in the master geographic database 124 is in an Oracle® spatial format, such as for development or production purposes. The master geographic database 124 may be produced and/or maintained by a map developer, such as NAVTEQ North America, LLC located in Chicago, Ill. The Oracle® spatial format or development/production database may be compiled into a delivery format, such as a GDF format. The data in the production and/or delivery formats may be compiled or further compiled to form geographic database products or databases 144, which may be used in navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation into the databases 144 may be performed by entities or providers of navigation systems or devices. Alternatively, the map developer or entity that maintains and controls the geographic database 124 may produce the databases 144.

Figure 2:
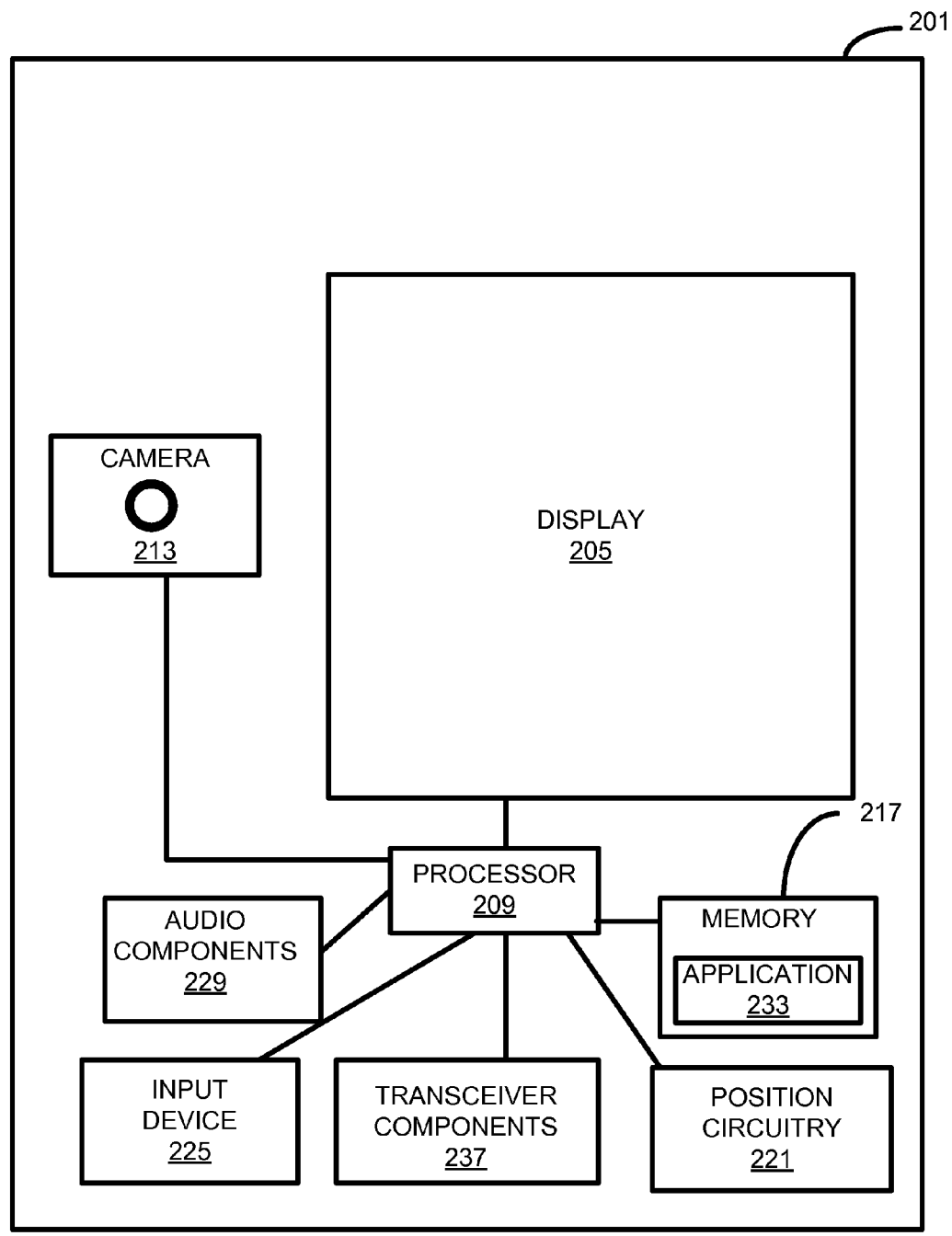
FIG. 2 illustrates components of a device that may be used in the system of FIG. 1.

FIG. 2 illustrates components of a user device 201, which may be similar to the user device 104. The user device 201 includes, but is not limited to, a processor 209, a display 205, a camera 213, an application program 233, a memory 217, an input device 225, positioning circuitry 221, audio components 229, and transceiver components 237. Additional, fewer, or different components may be provided. For example, housing components and a geographic database, such as a navigation-related database, may be provided. While the components in FIG. 2 are shown as separate from one another, one or more of these components may be combined.

The display 205 is any mechanical and/or electronic display positioned for accessible viewing in, on, or in communication with the user device 201. For example, the display 205 is a touch screen, liquid crystal display ("LCD"), cathode ray tube ("CRT") display, or a plasma display. The display 205 is operable to display images, such as photographs, as well as comment input screens. The display 205 may act as a hardware implementation of a user interface or a portion thereof.

The input device 225 is one or more buttons, keypad, keyboard, mouse, stylist pen, trackball, rocker switch, touch pad, voice recognition circuit, or other device or component for controlling or inputting data in the user device 201. Some or all components of the input device 225 may be part of a user interface of the device 201. The audio components 229 may include a speaker, microphone, audio jacks or connections (e.g., for a headset or headphones), and/or other audio circuitry. The positioning circuitry 221 is a global positioning satellite ("GPS") system, one or more mechanical and/or electrical sensors, one or more gyroscopes, a local positioning system, one or more direction sensors, or other system or device for providing position data, such as location data (e.g., longitude, latitude, and/or altitude) and/or direction data, of the user device 201.

The camera 213 includes, but is not limited to, a lens and circuitry for taking pictures. Additional, fewer, or different components may be provided. For example, a flash or flash circuitry may be provided. The camera 213 may be positioned so that the lens is facing away from the display 205 or is facing the same direction the display 205 is facing. Alternatively, the camera 213 may be positioned in or configured to move in and face any number of directions. The transceiver components 237 may include one or more antennas, a power amplifier, transmitter circuitry, receiver circuitry, and/or other components for transmitting and receiving signals wirelessly or through wired connections.

The display 205, the camera 213, the input device 225, the positioning circuitry 221, the transceiver components 237, and the audio components 229 are in communication with the processor 209. The processor 209 is a general processor, application-specific integrated circuit ("ASIC"), digital signal processor, field programmable gate array ("FPGA"), digital circuit, analog circuit, or combinations thereof. The processor 209 is one or more processors operable to control and/or communicate with the various electronics and logic of the user device 201. The processor 209 is configured to execute or run the application program 233. For example, the processor 209 associates a captured photograph with comment input, position data, and/or other information to generate a report, such as the report 108.

The application program 233 is software and/or code for generating reports, such as the report 108. The application program 233 may be compatible with a Windows® operating system, a Symbian® operating system, an Android™ operating system, and/or other operating systems. For example, the application program 233 controls or configures components of the user device 201 to take photographs of observed real-world geographic features and then associate information, such as comment information and position information, with the photograph to generate a report. The application program 233 may be stored in the memory 217 or other device or component of the user device 201.

The memory 217 is in communication with the processor 209. The memory 217 is any known or future storage device. The memory 217 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 217 may be part of the processor 209. The memory 217 is operable or configured to store photograph data, comment data, position data, and/or report data or other data associated with the user device 201.

Figure 3:
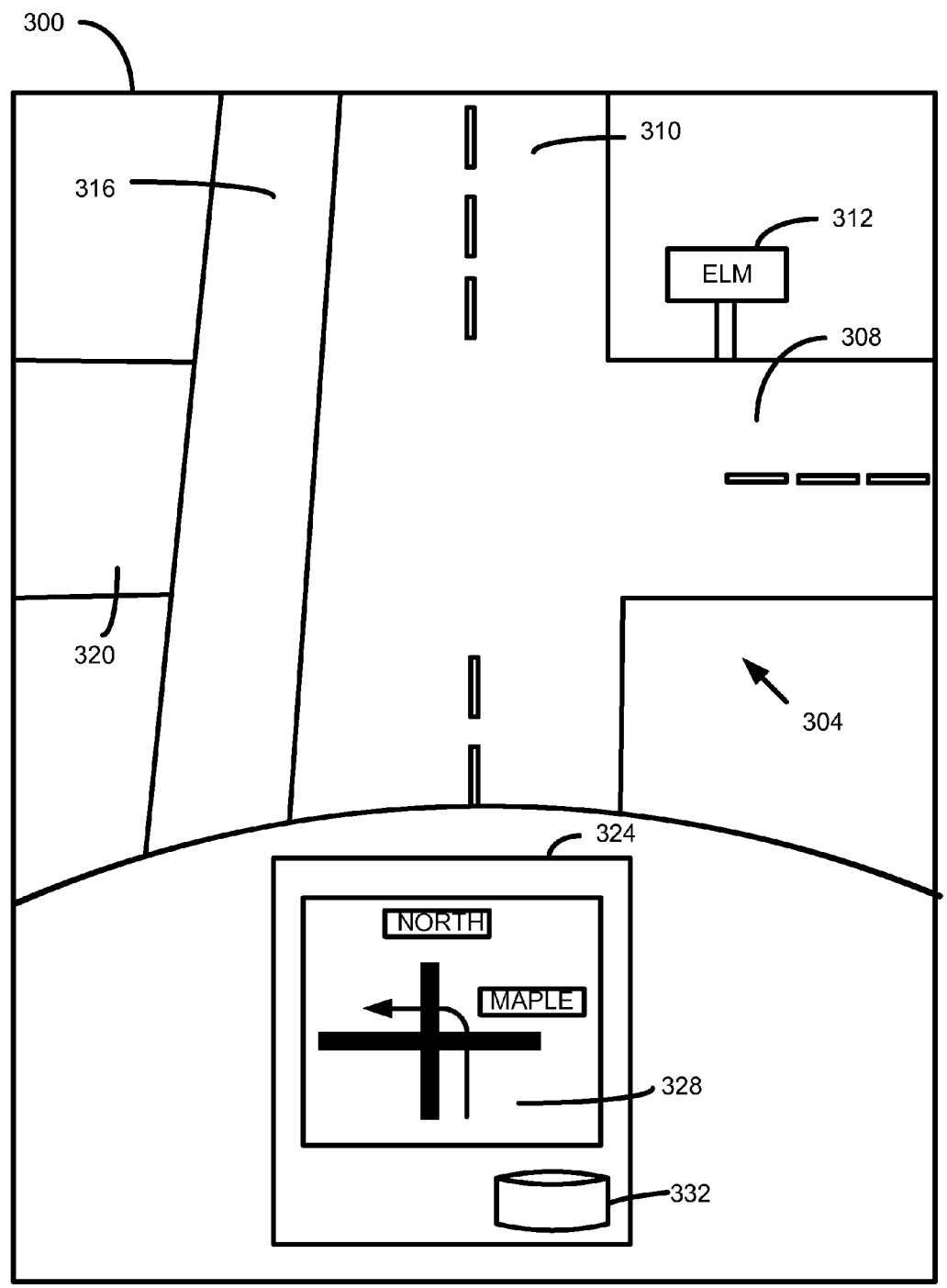
FIG. 3 is a diagram including a perspective view of real-world geographic features as well as a navigation device.

FIG. 3 is a diagram showing a perspective view of a real-world geographic region 304. In one embodiment, the geographic region 304 is viewed from inside a vehicle 300. The geographic region 304 includes a road 308, a road 310, a road 320, a barrier 316, and a street sign 312. A driver or user of a navigation device 324 uses the navigation device 324 for navigation-related functions, such as routing to a destination. The navigation device 324 is an in-vehicle navigation system, a PND, a cellular phone, or other device. The navigation device 324 includes a screen 328 for displaying or representing geographic data and a geographic database 332, which is similar to or different than the geographic database products or databases 144.

For example, the navigation device 324 instructs the driver of the vehicle 300 to make a left onto road 320. However, by observing the geographic region 304, the driver or user realizes that a left turn cannot be made onto the road 320 because of the barrier 316 (such as a permanent grass or concrete barrier or other type of barrier). Also, the navigation device 324 represents the road 308 with the name "MAPLE." However, by observing the street sign 312, the driver or user realizes that the street name is "ELM."

There are various reasons why a navigation system may provide incorrect, inaccurate or confusing information to an end user. One possible cause is that the geographic data used by the navigation system 324 may be incorrect. The geographic data may be incorrect because of an error made when the data were being collected. Alternatively, the geographic data used by the navigation system may be incorrect because the physical feature represented by the geographic data changed since the time the geographic data used by the end user's system was collected.

Another possible cause for an end user receiving incorrect, inaccurate or confusing guidance from the navigation system 324 can be an error in the software programming in the navigation system 324. In this case, the geographic data may be correct but the end user receives incorrect, inaccurate or confusing guidance because the software programming the navigation system 324 does not use the geographic data properly. Another reason why a navigation system may provide incorrect or confusing guidance is that the geographic data used by the navigation system may not include the attributes that are necessary to provide better instructions.

Regardless of the cause, the driver or user perceives discrepancies or errors regarding the geographic data used in the navigation device 324, and the user can report those discrepancies or perceived errors in the geographic data. For example, a user device, such as the user device 104 or 201, is used to generate a report, such as the report 108. The user device may be the navigation device 324 or a separate device.

Figure 4:
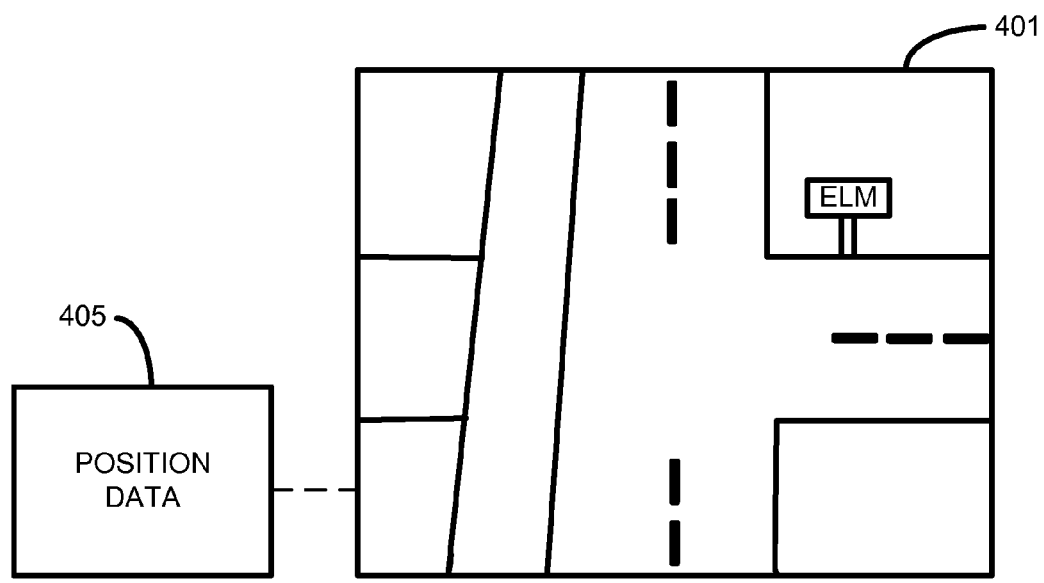
FIG. 4 illustrates an embodiment of a photograph.

For example, the user device is used to take a photograph of the geographic region 304 and/or one or more observed geographic features thereof. An observed geographic feature may include a road, a street name, a street sign, an address, a building, a tunnel, a bridge, or other real-world features. FIG. 4 is one embodiment of a photograph 401 that depicts the barrier 316 and how the roads 308 and 310 do not connect with the road 320. The photograph 401 may be in a JPEG, bitmap, pixmap, GeoTIFF, or other data format. Position data 405, such as latitude, longitude, and/or altitude values as well as direction information (e.g., the direction the photograph was taken in or the direction an object of the photograph is facing), may be part of the photograph data or may be associated with the photograph 401.

Figure 5:
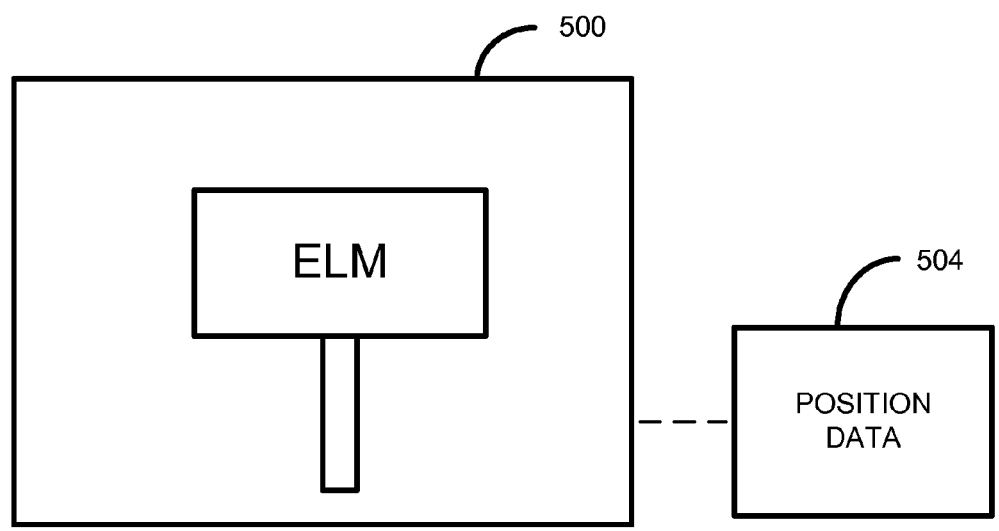
FIG. 5 illustrates an embodiment of another photograph.

FIG. 5 is one embodiment of a photograph 500 that depicts the observed street sign 312 and that shows the name of the road 308 to be "ELM." The photograph 500 may be in a JPEG, bitmap, pixmap, GeoTIFF, or other data format. Position data 504, such as latitude, longitude, and/or altitude values as well as direction information, may be part of the photograph data or may be associated with the photograph 500. Alternatively, one photograph, such as the photograph 401 may be taken as evidence or to show both perceived errors instead of taking two separate photographs.

Figure 6:
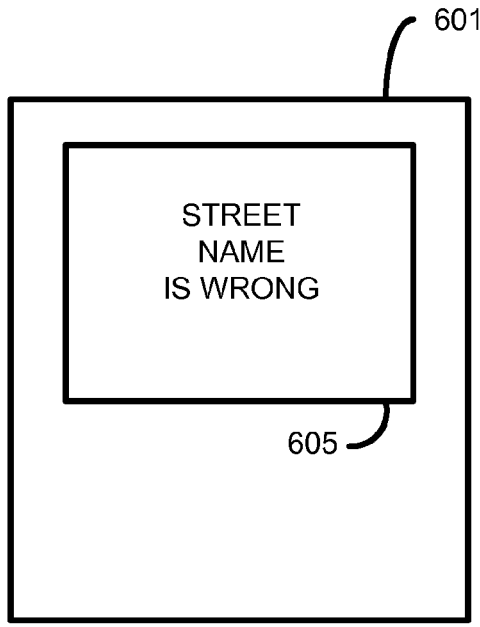
FIG. 6 illustrates comment information of a device that may be used in the system of FIG. 1.

FIG. 6 is one embodiment of a user device 601, such as the user device 104 or 201. For example, before or after the photograph 500 is taken or captured, a software user interface or comment screen 605 is provided to the user to enter a comment corresponding to one or more observed geographic features. The user may type or input a comment, such as "Street Name Is Wrong," that will be associated with the photograph 500 to, ultimately, generate a report.

Figure 7:
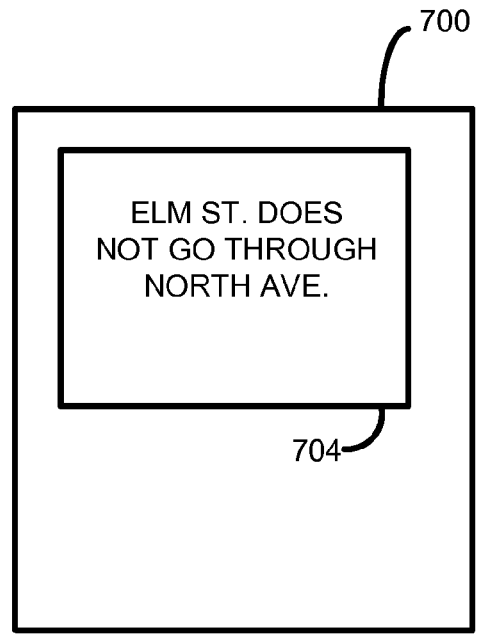
FIG. 7 illustrates alternate comment information of a device that may be used in the system of FIG. 1.

FIG. 7 is one embodiment of a user device 700, such as the user device 104, 201, or 601. For example, before or after the photograph 401 is taken or captured, a software user interface or comment screen 704 is provided to the user to enter a comment. The user may type or input a comment, such as "ELM St. Does Not Go Through North Ave." or "ELM St. Does Not Connect To The Road On The Other Side Of North Ave.," that will be associated with the photograph 401 to, ultimately, generate a report. Regarding the photographs 401 and 500, two separate respective reports may be generated or both the photographs may be combined into a single report.

Figure 8:
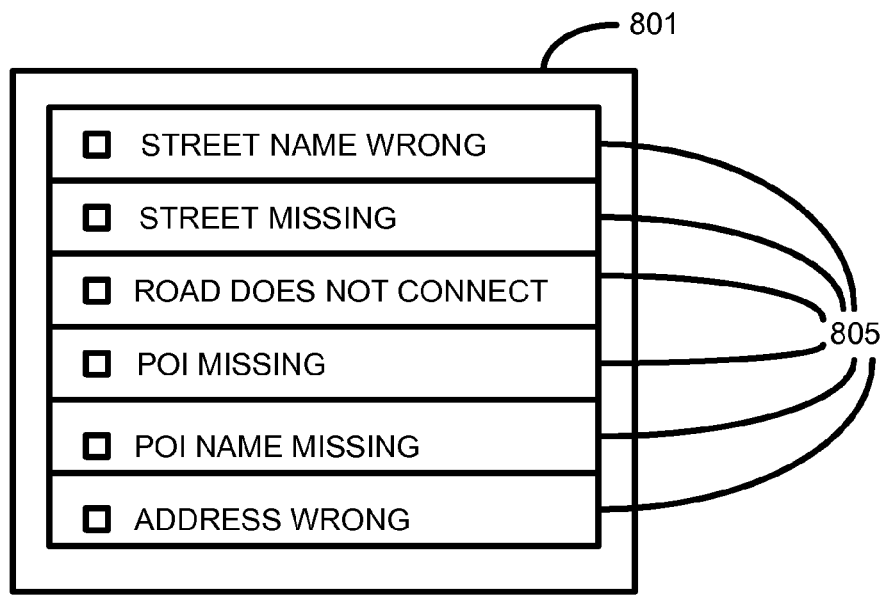
FIG. 8 illustrates a user interface screen for inputting a comment.

FIG. 8 is an alternate embodiment of a user interface or comment screen 801. For example, instead of inputting or entering a comment, a user may choose, check off, or select one or more predetermined comments 805. The predetermined comments 805 may be presented in a list or listed option format to be checked off or selected. Examples of predetermined comments include: "Street Name Wrong," "Street Missing," "Road Does Not Connect," "POI Missing," "POI Name Wrong," and "Address Wrong." Alternatively, instead of entering or selecting comments via a keyboard, screen or other touch input, a user may use voice commands or comments to associate comments with photographs. Also, the comments or comment information may be associated with or may be any other indication, such as a tag or flag, of a perceived discrepancy or error.

In addition to a photograph, associated position data, and comments, the report may also include information or data regarding maneuvers or instructions provided by a navigation device. For example, the graphical and/or audio maneuver instructions or routing data of the navigation device 324 may be saved or stored and incorporated in a report that includes a photograph, position data, and comment information. In one embodiment, a screen shot of the navigation device 324 that is associated with a perceived error is associated with a photograph of an observed geographic feature and/or other data and is used to generate a report, such as the report 108.

In another embodiment, the report, such as the report 108, may include a photograph without associated comments. For example, a photograph of a perceived discrepancy or error between an observed geographic feature and geographic data is taken or captured. Then the photograph is formed into a report, such as an email, without associated comment or text information. The report may be sent to a particular mail or email box or other electronic destination associated with the perceived discrepancy. For example, the map developer may have separate mail boxes, such as a mail box for missing roads, missing POI's, erroneous road names, erroneous road connections, etc. Accordingly, the received photographs are understood to indicate or correspond to a discrepancy related to the mail box they are received in, and the user does not have to enter or select comments.

The user of the user device may be able to email the photograph and/or report to a number or email addresses or electronic locations. The different emails or related discrepancy subjects may be displayed or provided to the user to select from, via a user interface, before or after taking a photograph. The different electronic locations or addresses or related discrepancy subjects may be displayed in a listed format, such as the predetermined comments or options 805. Or, the user may enter or input an email address or location for transmission. In an alternate embodiment, the report, having no associated comments, may be sent to the map developer without the use of specific email addresses or related discrepancy subjects. Accordingly, the map developer or employees thereof may view the photograph and determine a discrepancy or error based on their own analysis or comparison.

Figure 9:
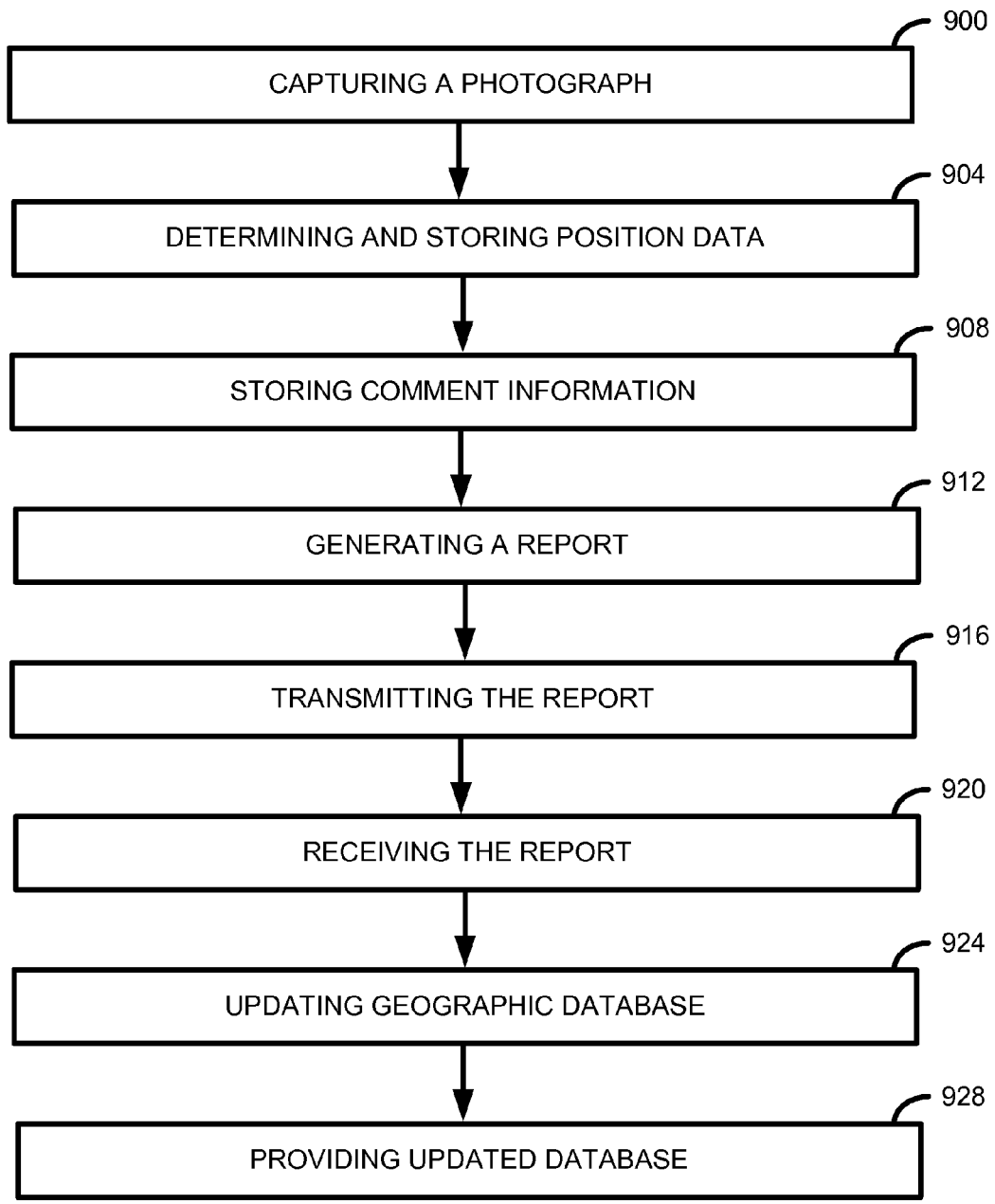
FIG. 9 is a flowchart of a method for updating a geographic database and/or reporting discrepancies regarding geographic data of the geographic database.

FIG. 9 is a flowchart of a method of updating a geographic database, such as the geographic database 124, 144, and/or 332, and/or reporting discrepancies or perceived errors in geographic data of the geographic database. Fewer or more steps or acts may be provided, and a combination of steps may be provided. Also, the steps or acts may be performed in the order as shown or in a different order. The method is implemented by the system and/or devices described herein or by different devices or systems.

In one embodiment, a person uses a navigation device, such as the navigation device 324, to route to a destination. For example, an end user drives or walks to a destination, such as to a POI or a specific address, based on instructions and presentation of geographic data from the navigation device. Before or while traveling to the destination or when reaching the destination, the end user discovers one or more discrepancies between data of a geographic feature or geographic region thereof used in the navigation device and an observed geographic feature. A discrepancy may be a perceived error in the geographic data, such as an erroneous street name, an erroneous road connection, an erroneous point-of-interest name, an erroneous road or road portion, an erroneous point-of-interest or structure, an erroneous sign, etc. The discrepancy may also be a perceived lack of information in the geographic data, such as a missing road, a missing point-of-interest, a missing road connection, a missing sign, a missing tunnel, a missing bridge, etc. The term "perceived error" may correspond to both a mistake in data and a lack of data.

For example, the navigation device may instruct the user to make a left on a road that, based on real-world observance, is not connected and cannot be turned onto. Or, the navigation device may present an erroneous name of a building or street, or the navigation device may present a data representation of a geographic region that is missing a road or POI. The user may perceive these discrepancies to be errors in the geographic data. Accordingly, the user would like to report the perceived errors to update and correct a geographic database and/or geographic data thereof. For example, the user turns on a user device, such as the user device 104, 201, 601, or 700, or turns on or selects an application or program in the user device for reporting discrepancies. The activation of the application also may activate or configure a camera and other components. The user device may or may not be the navigation device.

A photograph of an observed real-world geographic feature in a geographic region is captured and/or stored (Step 900). For example, the user device is used to take a picture or photograph, such as the photograph 401 or 500, of the observed geographic feature and/or the geographic region thereof that is associated with the perceived error or discrepancy. The photograph may be taken while driving or walking, or the user may step away from a vehicle to take a closer picture.

Before, during, or after the photograph is taken, the user device determines and/or stores position data associated with the photograph (Step 904). For example, positioning circuitry, such as the position circuitry 221, calculates or determines latitude and longitude coordinates of the location of the user device. The distance between the user device and the object of the photograph may be estimated to determine an estimated latitude and longitude of the observed geographic feature (captured in the photograph). Also, altitude data and direction data, such as what direction (North, South, East, West) is the picture taken from or what direction the observed geographic feature is oriented in, may be determined. The position data may be stored as separate data that is associated with the photograph and/or may be stored as data that is to be a part of the photograph, such as part of the image data.

Comment information regarding the discrepancy and/or perceived error is allowed to be entered and stored (Step 908).

For example, after or before the photograph is taken, a comment screen, such as the screen 605, 704, or 801, is provided to the user of the user device. The user may enter or input a comment via a touch action or may select a comment from a list of predetermined comments, such as the comments 805. Also, the user may input a comment via a voice command or input. The comment is indicative of the discrepancy or perceived error between the geographic data used in the navigation device and the observed geographic feature.

A report, such as the report 108, is generated based on the photograph, position data, the comment information, and/or other associated data or information, such as generated driving maneuvers/instructions, sketches, or time information (Step 912). For example, the user device uses the comment input to form text, such as in a HTML or XML format, and the text is associated with the respective photograph. The photograph may be an attachment to the text. The position data may be provided in the text and/or the photograph image data, such as via GPS tags or other tags or stamps. The report is formatted or generated for easily viewing the comments and the photograph. In one embodiment, the report may have an email structure. Alternatively, the text or comment information and/or position data may be provided in the photograph, such as text superimposed or added on top or within the photograph. Also, the report may include the photograph with or without position data, comment data, and/or other data.

After the report is generated, the report is transmitted or sent to a map developer or map developer site or location (Step 916). For example, after the report is formed, the software application, such as the software application 233, instructs the user device to automatically send the report. Or, the user is prompted with an option to submit the report, or the user may transmit the report at any time in the future. The report may be transmitted to an email address or other electronic/data location. In one embodiment, a photograph, without associated comments, may be emailed to specific discrepancy related email addresses (such as an email address related to only erroneous road names). The report is transmitted wirelessly to a server, such as the server 116, via a network, such as the network 112.

The report is received by the map developer, such as via a workstation (e.g., the workstation 120), (Step 920). The operator of the work station reviews the report and views the existing geographic data contained in a master geographic database, such as the geographic database 124. The report provides visual evidence via the photograph and/or other data, such as position data, and the operator recognizes any potential error or lack of information from the photograph and/or other information, such as comment information or a particular email address or indication. The position data may be used to confirm that the location is accurate.

The operator, via the workstation, corrects and/or updates the master geographic database and/or geographic data thereof based on the received report (Step 924). The update or correction may be an incremental update or universal update. In an alternate embodiment, the geographic database or a copy thereof is updated automatically based on receiving the report (e.g., the photograph may be saved and associated with the automatic update for audit or review purposes).

The updated database or geographic data thereof are provided or distributed (Step 928). For example, the updated database in a delivery format or GDF format is provided to one or more entities that use the geographic data for various purposes, such as for compiling geographic data to form geographic database products or geographic databases (e.g., the databases 144 or 332) for navigation systems or devices. Accordingly, by updating the master geographic database, such sub-databases and/or data thereof are updated or corrected as well.

Alternatives

Figure 10:
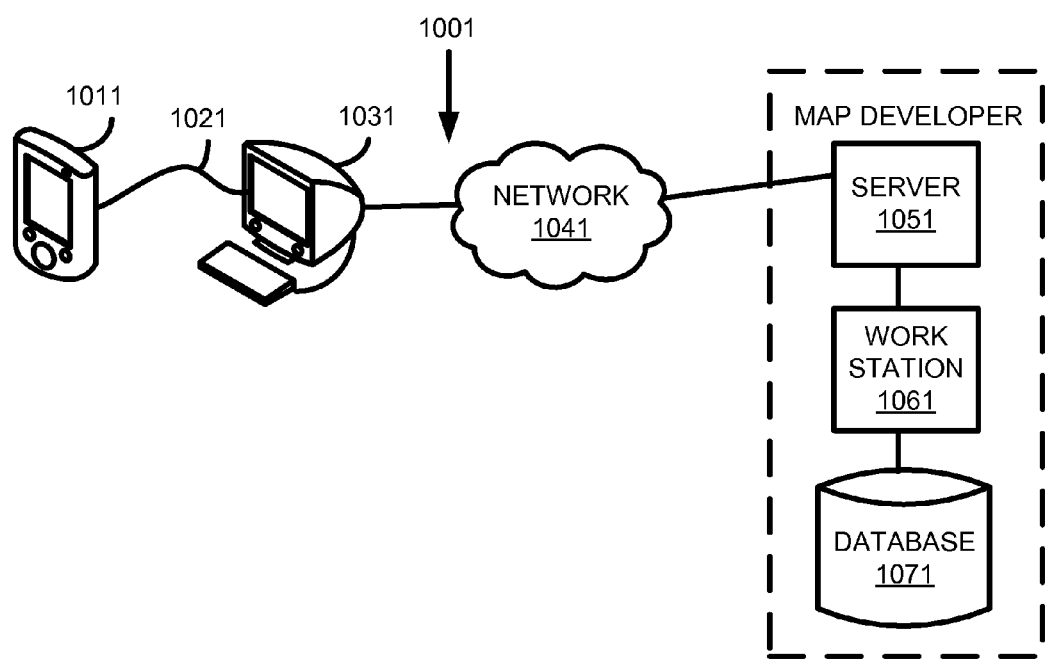
FIG. 10 is a diagram of an alternate system for updating a geographic database and/or reporting discrepancies regarding geographic data of the geographic database.

FIG. 10 shows an embodiment of an alternate system 1001 for updating a geographic database and/or reporting discrepancies regarding geographic data. The system 1001 includes, but is not limited to, a user device 1011, a connection 1021, a computer or computing device 1031, a network 1041, a server 1051, one or more workstations 1061, and a geographic or navigation-related database 1071. Additional, fewer, or different components may be provided.

Instead of generating a report and transmitting the report from the user device, mentioned above, one may use the computer 1031 and/or programs thereof to assist with generating and transmitting the report. For example, a user takes a photograph via the user device 1011, which is similar to or different than the user device 104 or 201. The user device 1011 also associates position data with the photograph. A user then connects the user device 1011 with the computer 1031 via the connection 1021. The connection 1021 may be a wired or wireless connection.

The user may open a website and/or program to report perceived errors or discrepancies via the computer 1031. For example, the user may enter or input comments into the website or program screen, similar or different than the screen 601, 700, or 801. The user may also attach or upload the photograph to be associated with the comments. Accordingly, the computer 1031 is used to generate a report, such as the report 108.

The report is transmitted to a map developer via a network 1041, which is similar to or different than the network 112. The map developer may maintain the server 1051, the workstation 1061, and the database 1071 to process the report. The server 1051, the workstation 1061, and the database 1071 may be similar to or different than the server 116, the workstation 120, and the database 124, respectively.

Alternatively, the user device 1011 may be used to generate the report, but the computer 1031 acts as an intermediary device to transmit or send the report to the proper location.

Figure 11:
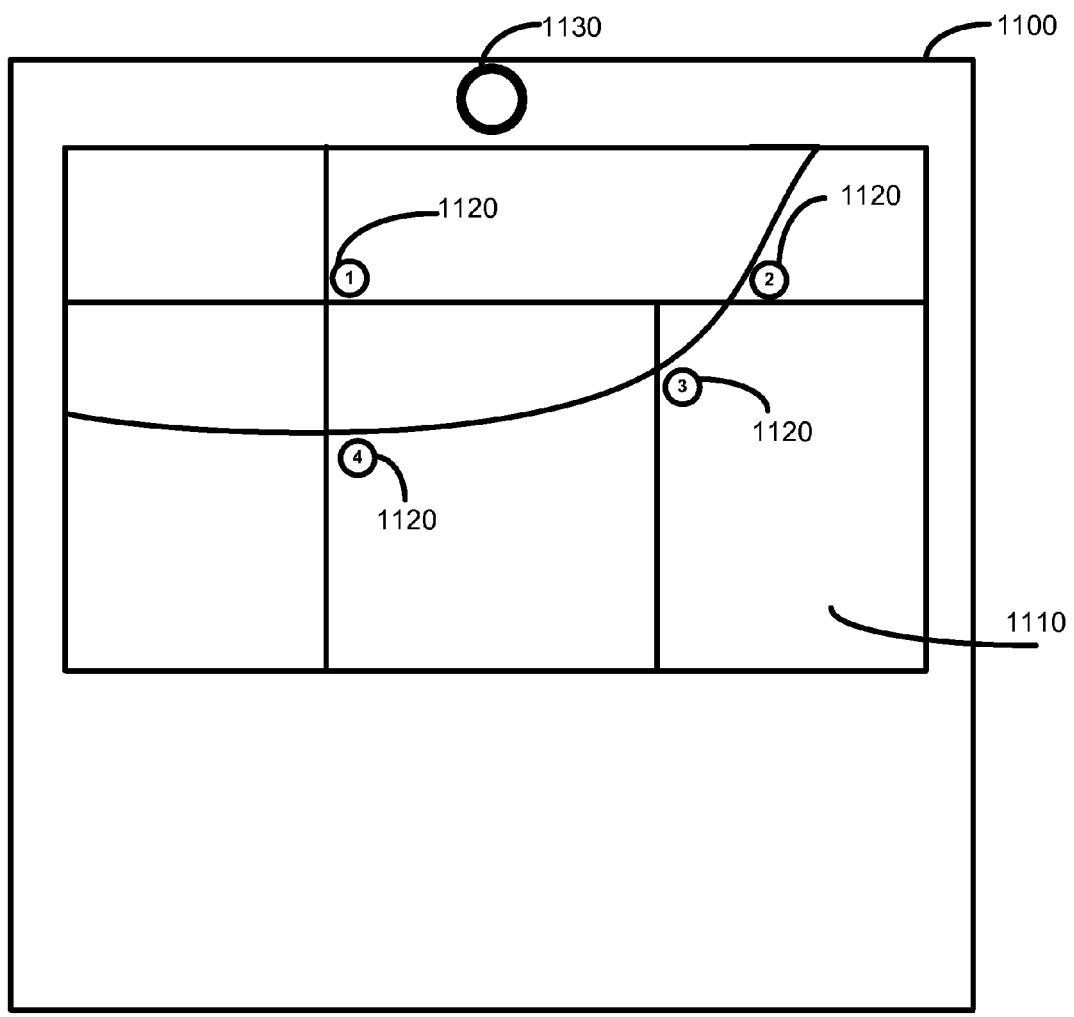
FIG. 11 illustrates an embodiment of a user device for use in an alternate system or method of updating a geographic database and/or generating reports regarding geographic data.

FIG. 11 shows an embodiment of a user device 1100, which is similar to or different than the user device 104 or 201, for use in an alternate system or method of updating a geographic database and/or generating reports regarding geographic data. The user device 1100 includes or provides a screen 1110 that depicts a geographic region, such as a town, city, suburb, and/or associated areas. The user device also includes a camera 1130, such as the camera 213.

Location icons 1120 are displayed via the screen 1110. The location icons 1120 represent places or positions that are associated with existing perceived errors or discrepancies, such as perceived error comments, known or received by a map developer. For example, navigation device end users may submit text corresponding to perceived errors in geographic data via a website or a navigation device. The map developer receives the perceived error comments or information but still needs to confirm the validity of the comments.

Accordingly, the user device 1100 is provided to one or more employees of the map developer, contractors, third-parties, volunteers, etc. The user device 1100 includes a software program that provides the locations associated with the perceived error information, such as via the location icons 1120. The actual text or comments may also be provided. The employee, volunteer, and/or user travels to each of the locations identified by the icons 1120 and takes or captures a photograph. Position data may or may not be associated with the photograph. The photograph is then transmitted to the map developer to confirm the perceived error information, and a geographic database is updated accordingly. The photograph may act as a separate report and/or may be associated with the existing perceived error information. In another embodiment, the employee, volunteer, and/or user may walk or move around, and when the user gets close to a location represented by the icons 1120, the user device 1100 may trigger a proximity notification, such as a sound, an alarm, a light, a visual display, a vibration, and/or other indicator, so that the user may use the user device 1100 to generate a report.

Furthermore, in an alternate embodiment, instead of using a user device or connectable intermediary device to generate a report, a server, such as the server 116 or 1051, may include a program to generate reports. For example, photographs, position data, comments, and other information may be transmitted to the server. The server then configures or structures the different data into a report that is presented at a workstation of the map developer.

The logic, software, or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

We claim:

1. A computer-implemented method for updating a geographic database that includes geographic data for navigation-related services, the method comprising:
providing, via a user device, an indication of a real-world geographic feature in a geographic region that is associated with a perceived discrepancy;
capturing, via a camera of the user device, a photograph of the real-world geographic feature;
storing comment information corresponding to the real-world geographic feature, the comment information indicative of an observed discrepancy between the real-world geographic feature and the geographic data corresponding to the geographic region;
determining geographic position data of a location of the camera capturing the photograph;
determining an estimation of a distance between the real-world geographic feature captured in the photograph and the geographic position data of the location of the camera capturing said photograph;
associating the comment information and the geographic position data with the photograph to generate a report; and
transmitting the report including the photograph, the geographic position data, and the comment information,
wherein the perceived discrepancy comprises a perceived lack of information in the geographic data corresponding to the geographic region, and
wherein the perceived lack of information comprises a missing feature in the geographic data.

2. The computer-implemented method of claim 1, wherein the perceived discrepancy comprises a perceived error in the geographic data corresponding to the geographic region.

3. The computer-implemented method of claim 2, wherein the perceived error comprises an erroneous street name, an erroneous road connection, an erroneous point-of-interest name, an erroneous road or road portion, or an erroneous point-of-interest.

4. The computer-implemented method of claim 1, wherein the missing feature in the geographic data comprises a missing road, a missing point-of-interest, or a missing road connection.

5. The computer-implemented method of claim 1, wherein the real-world geographic feature comprises a road, a street name, a street sign, an address, or a building.

6. The computer-implemented method of claim 1, wherein transmitting the report comprises transmitting the report to a map developer, the method further comprising updating the geographic database based on the report.

7. The computer-implemented method of claim 1, wherein the geographic position data comprises latitude and longitude coordinates.

8. In a non-transitory computer readable medium configured to store instructions, executable by a processor, for reporting perceived errors in geographic data of a navigation-related database, the instructions comprising:
providing, via a user device, an indication of a real-world geographic feature in a geographic region that is associated with an existing perceived discrepancy;
storing data representing a photograph of the real-world geographic feature, the photograph captured via a camera of the user device;
determining position data associated with a location of the camera capturing the photograph;
determining an estimation of a distance between the real-world geographic feature captured in the photograph and the position data of the location of the camera capturing said photograph;
allowing comment data to be entered by a user of the user device, the comment data corresponding to an observed perceived discrepancy in the geographic data,
wherein the data representing the photograph, the position data, and the comment data are formed into a report for a map developer,
wherein the existing perceived discrepancy comprises a perceived lack of a feature in the geographic data corresponding to the geographic region.

9. The non-transitory computer readable medium of claim 8, wherein the perceived lack of the feature in the geographic data comprises an erroneous street name, an erroneous road connection, an erroneous point-of-interest name, an erroneous road or road portion, an erroneous point-of-interest, a missing road, a missing point-of-interest, or a missing road connection.

10. The non-transitory computer readable medium of claim 8, wherein the real-world geographic feature comprises a road, a street name, a street sign, an address, or a building.

11. The non-transitory computer readable medium of claim 8, wherein the position data comprises latitude and longitude coordinates.

12. The non-transitory computer readable medium of claim 8, wherein the comment data to be entered is presented in a listed option format.

13. The non-transitory computer readable medium of claim 8, wherein storing the data representing the photograph and determining the position data are executed via the user device.

14. The non-transitory computer readable medium of claim 8, wherein the report is transmitted to the map developer location to update the navigation-related database.

15. A user device for reporting perceived errors in geographic data of a geographic database used for navigation-related services, the user device comprising:
   a user interface configured to indicate a real-world geographic feature in a geographic region that is associated with an existing perceived discrepancy;
   a processor in communication with the user interface;
   a camera in communication with the processor, the camera configured to capture a photograph of the real-world geographic feature corresponding to the existing perceived discrepancy in the geographic data, the photograph captured in response to the indicated real-world geographic feature;
   position determination circuitry in communication with the processor, the position determination circuitry configured to determine position data corresponding to the camera, wherein an estimation of a distance between the real-world geographic feature captured in the photograph and the position data of the camera is determined;
   wherein the user interface is further configured to receive comment input from a user regarding an observed perceived error between the real-world geographic feature and the geographic data, and
   wherein the processor is configured to associate the captured photograph with the comment input and the position data to generate a report,
   wherein the existing perceived discrepancy comprises a perceived lack of a feature in the geographic data corresponding to the geographic region.

16. The user device of claim 15, wherein the user device is a cellular phone.

17. The computer-implemented method of claim 1, further comprising providing a comment screen for receiving the comment information, the providing performed in response to the capturing.

18. The computer-implemented method of claim 1, wherein determining the geographic position data comprises determining, via the user device, the geographic position data of the real-world geographic feature captured in the photograph.

19. The computer-implemented method of claim 1, further comprising providing, to a user of the user device, a notification when the user is in proximity to the real-world geographic feature that is associated with the existing perceived discrepancy.

* * * * *